July 3, 1956

L. G. HILKEMEIER 2,753,163

DRUM TRACK OR TIRE

Original Filed March 20, 1951

LOUIS G. HILKEMEIER
INVENTOR.

BY

July 3, 1956  L. G. HILKEMEIER  2,753,163
DRUM TRACK OR TIRE

Original Filed March 20, 1951  2 Sheets-Sheet 2

LOUIS G. HILKEMEIER
*INVENTOR.*

BY [signature]
*Atty*

United States Patent Office 2,753,163
Patented July 3, 1956

2,753,163
DRUM TRACK OR TIRE

Louis G. Hilkemeier, Plainfield, N. J., assignor to Worthington Corporation, Harrison, N. J., a corporation of Delaware Original application March 20, 1951, Serial No. 216,539, now Patent No. 2,678,198, dated May 11, 1954. Divided and this application March 18, 1954, Serial No. 417,038

2 Claims. (Cl. 259—175)

This invention relates generally to machines having rotatable mixing drums and more particularly to a drum track or tire for said mixing drums, and is a divisional application of the copending application, Serial No. 216,539, filed March 20, 1951, now Patent No. 2,678,198, granted May 11, 1954.

In my above-identified copending application, it was pointed out that in rotatable mixing drums wherein the drum track consists of a solid member welded to the mixing drum that breakdowns will occur during operation thereof due to loss of flexibility at the weld point between the different type steels of which the drum track and mixing drum are customarily formed.

The present invention provides another means for overcoming this difficulty wherein once again, a separate drum track support member is provided which is composed of the same or substantially similar type steel to that of the rotatable mixing drum to which it is welded on which the drum track is shrunk-fit and provided with suitable keeper means to prevent lateral movement thereof.

Accordingly, it is an object of the present invention to provide a novel drum track construction for a rotatable mixing drum.

It is another object of the present invention to provide means for preventing the lateral displacement of the drum track on its drum track support.

With these and other objects in view as may appear from the accompanying specification, the invention consists of various features of construction and combination of parts, which will be first described in connection with the accompanying drawings showing a drum track or tire of a preferred form embodying the invention, and the features forming the invention will be specifically pointed out in the claims.

Figure 1:
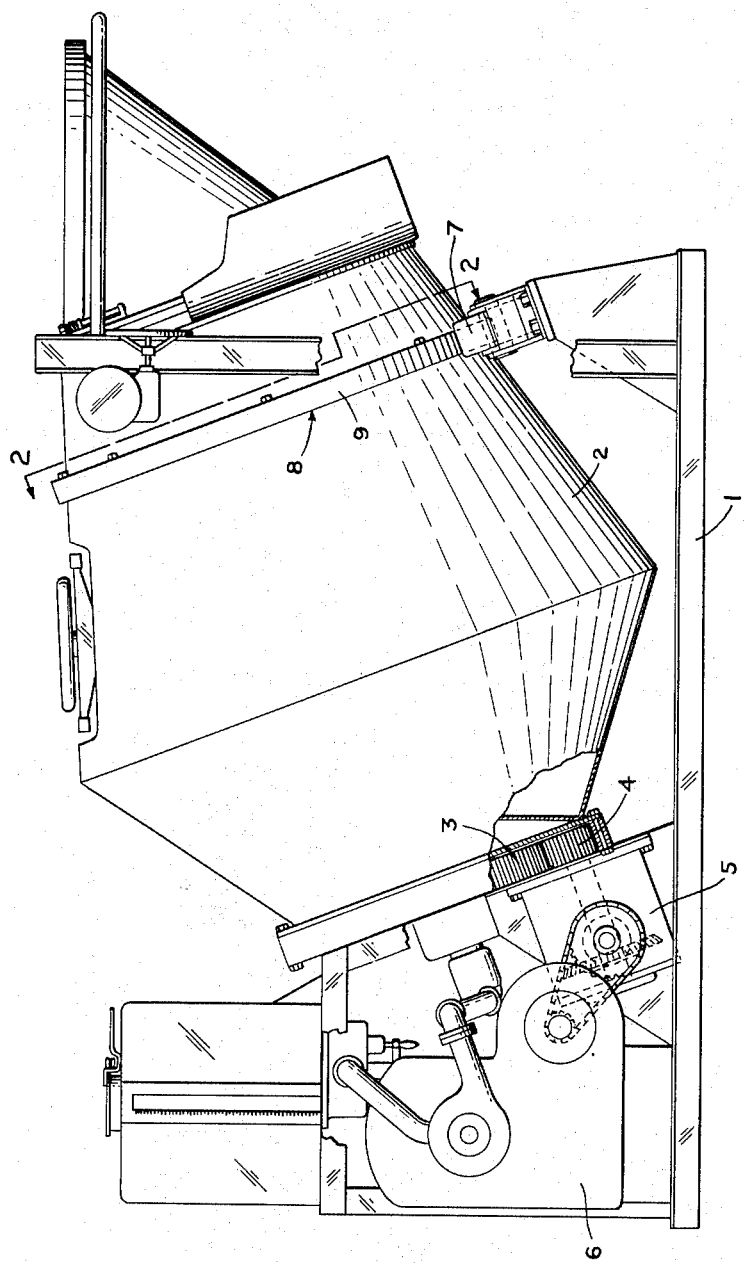
Figure 1 is a side elevation of a transit type truck mixer having a rotatable drum thereon and showing the invention on said drum.

Referring more particularly to the drawings, Figure 1 shows a transit type truck mixer having a frame 1. Mounted on said frame 1 is a mixing drum 2 which is rotated by means of a drum gear ring 3 and pinion member 4 which is in turn connected by a suitable means 5 to a prime mover 6. There are many well known types of connecting means and prime movers easily purchasable on the open market and therefore they are not described here as they do not form part of the present invention.

Mounted remotely from the means for rotating the drum are smooth rollers 7 which receive for rotation thereon the drum track 8 which is connected to the mixing drum 2 as is hereinafter described.

Figure 2:
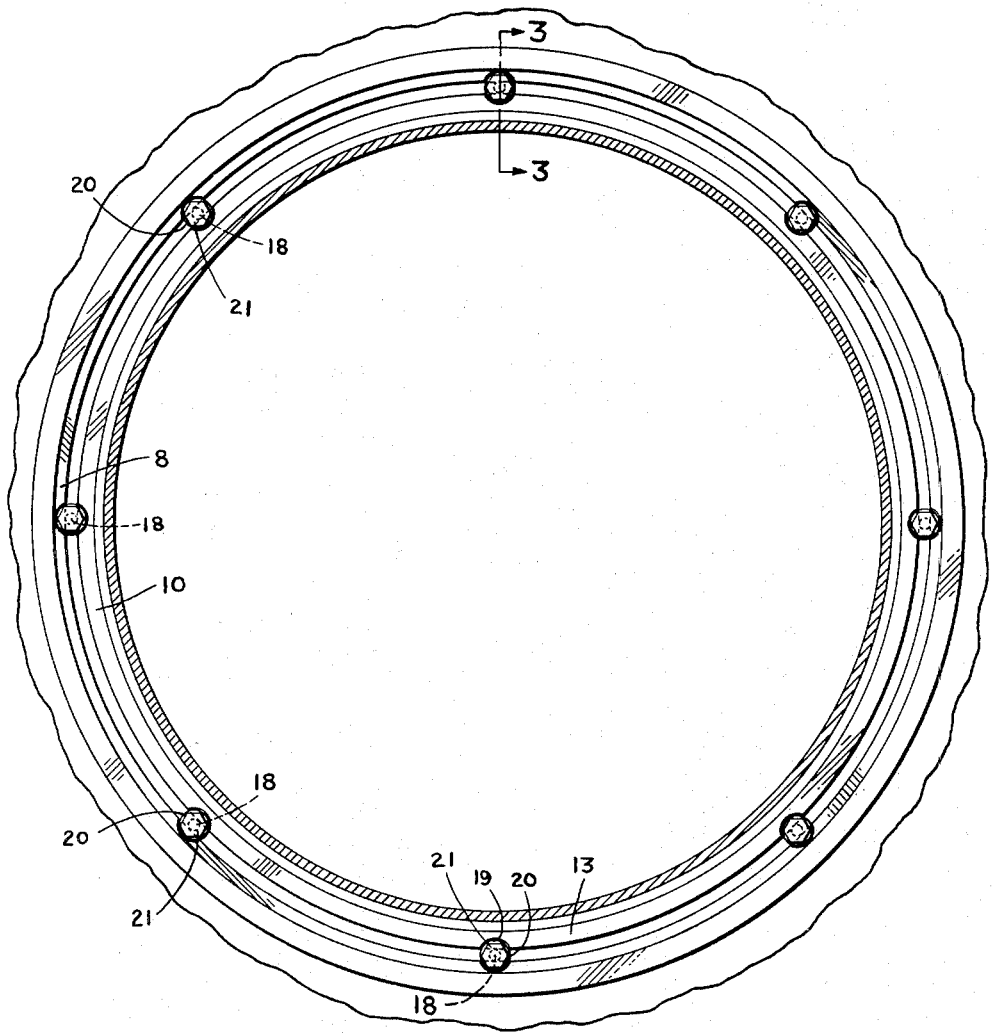
Figure 2 is a front view of the invention taken on the lines 2—2 of Figure 1.
Figure 3:
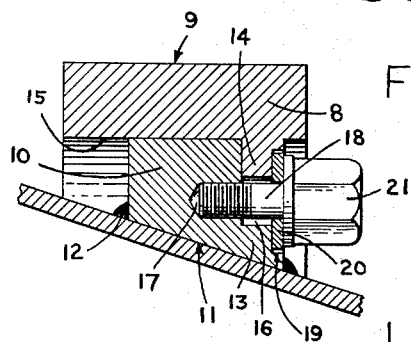
Figure 3 is a section through the invention taken on the line 3—3 of Figure 2.

The drum track 8 is a substantially light cylindrical shell being rectangular in cross-section so that its rolling face 9 will be true when it is shrunk-fit onto a suitable drum track support 10 as is shown in Figures 2 and 3 of the drawings. It is formed of high carbon steel to give it the maximum useful life.

The drum track support 10 is shown in Figures 2 and 3 as having a substantially annular construction, its inner face 11 being beveled so that it may snugly engage the outer surface of the mixing drum 2 to which it is welded as at 12. It is provided with a lateral projection or shoulder 13 on one side thereof circumjacent to and continuous with the inner face 11. The drum track support 10 will be of a mild steel similar to that of the mixing drum so that the welds will not reduce the flexibility of this joinder. It will be understood that while the drum track support is shown as a single annular member that it might consist of a plurality of arcuate or similarly shaped supports without departing from the purpose and spirit of the invention.

The lateral projection or shoulder 13 will be substantially identical in thickness to that of an annular flange 14 disposed on the inner wall 15 of the drum track 8. When the drum track 8 is shrunk-fit into position on the drum track support 10 an annular space 16 will be formed between the flange 14 on the drum track 8 and the lateral projection or shoulder 13 on the drum support 10. This annular space 16 opens the side of the drum track 10 adjacent the flange 14 and projection 13 so that the track 10 is adapted to receive in suitable threaded bore 17, the annularly spaced studs 18, as clearly shown in Figures 2 and 3 of the drawings.

Spaced coincidentally with the studs 18 are counterbores 19 formed in the faces of the annular flange 14 and the lateral projection 13, with their respective centers in the axial line of the studs 18. Machined washers 20 are mounted about each of said studs to fit into said counterbores 19 and are locked in position by cap nuts 21. Threading the cap nuts 21 inwardly will force the washer members into engagement with the counterbores 19 thus forcing the annular flange 14 into tight engagement with the track support 10 to prevent any lateral shifting of the drum track 8. In addition, this construction prevents any rotation of the drum track 8 relative to the drum track support 10.

It is believed obvious that the above described construction could be modified by eliminating counterbores 19. If the counterbores 19 are eliminated lateral displacement of the drum track 8 relative to the drum track support will still be prevented.

It will be understood that the invention is not to be limited to the specific construction or arrangement of parts shown, but that they may be widely modified within the invention defined by the claims.

What is claimed is:

1. The combination with a rotatable mixing drum having a discharge opening at one end thereof, and driving means for rotating said mixing drum, of, a separate annular drum track support means welded to the outer circumference of said mixing drum near the discharge end thereof, a shoulder formed integrally with said drum track support means, a drum track mounted on said support means to provide a surface of rotation for said mixing drum, a flange formed on the inner circumference of said drum track adapted to abut said support means, and holding means including spaced studs threadably connected to the drum track support between said annular flange and said shoulder, counterbores in the face of said flange and said shoulder in coincident relationship to said spaced studs and in the axial line thereof, washers fitted in said counterbores, and a cap nut for threadably forcing said washer into abutting contact with the counterbore so as to prevent lateral movement of said drum track and movement of said drum track.

2. In combination, a rotatable mixing drum, an annular support ring welded to the outer periphery of said drum having a shoulder formed thereon adjacent said drum periphery, an annular drum track mounted on the outer periphery of said support ring having a flange thereon adjacent said shoulder adapted to abut said support ring, said flange extending inwardly of said track in spaced relationship with said shoulder to form an annular recess therewith, threaded means extending through said annular recess and threadably connected to said support ring to prevent longitudinal displacement of said track with respect to said support ring, and other means on said threaded members abutting said flange and shoulder to prevent rotational displacement of said track with respect to said support ring.

References Cited in the file of this patent

UNITED STATES PATENTS

| | | |
|---|---|---|
| 1,055,599 | Ball | Mar. 11, 1913 |
| 1,536,491 | Gunderoth | May 5, 1925 |

FOREIGN PATENTS

| | | |
|---|---|---|
| 436,358 | Great Britain | Oct. 9, 1935 |
| 753,644 | France | Oct. 20, 1933 |